United States Patent [19]
Sam

[11] Patent Number: 6,094,856
[45] Date of Patent: *Aug. 1, 2000

[54] FISHING LURE

[76] Inventor: Kenneth P. Sam, 444 Berford Street Box 384, Wiarton, Canada, N0H 2T0

[ * ] Notice: This patent issued on a continued prosecution application filed under 37 CFR 1.53(d), and is subject to the twenty year patent term provisions of 35 U.S.C. 154(a)(2).

[21] Appl. No.: 09/119,728

[22] Filed: Jul. 21, 1998

[51] Int. Cl.[7] .................................................. A01K 85/00
[52] U.S. Cl. ........................................................ 43/42.5
[58] Field of Search ............................... 43/42.5, 42.51; D22/129, 42.5

[56] References Cited

U.S. PATENT DOCUMENTS

| | | | |
|---|---|---|---|
| D. 162,776 | 4/1951 | Bekkala | D22/129 |
| 1,326,821 | 12/1919 | Ackerman | 43/42.5 |
| 1,471,280 | 10/1923 | Reekers | 43/42.5 |
| 1,769,083 | 7/1930 | Tozier | 43/42.51 |
| 1,803,056 | 4/1931 | Davis | 43/42.5 |
| 1,837,656 | 12/1931 | Crosby | 43/42.51 |
| 1,866,623 | 7/1932 | Crow | 43/42.5 |
| 1,924,350 | 8/1933 | Cordell | 43/42.5 |
| 1,956,783 | 5/1934 | Yeo | 43/42.5 |
| 1,963,380 | 6/1934 | Peters | 43/42.5 |
| 2,088,775 | 8/1937 | Davenport | 43/42.5 |
| 2,218,259 | 10/1940 | Finucan | 43/42.5 |
| 2,394,132 | 2/1946 | Zeibig | 43/42.5 |
| 2,511,002 | 6/1950 | Perry | 43/42.5 |
| 2,527,064 | 10/1950 | Hufnagel | 43/42.5 |
| 2,538,703 | 1/1951 | Perry | 43/42.5 |
| 2,698,494 | 1/1955 | Larsen | 43/42.5 |
| 2,748,523 | 6/1956 | McNabb | 43/42.5 |
| 2,787,860 | 4/1957 | Carr | 43/42.5 |
| 2,791,057 | 5/1957 | Memoli | 43/42.5 |
| 3,673,727 | 7/1972 | Bauer | 43/42.51 |
| 3,982,349 | 9/1976 | Hills | 43/42.48 |
| 4,136,479 | 1/1979 | Pierceall | 43/42.22 |
| 4,155,192 | 5/1979 | Varaney | 43/42.5 |
| 4,589,223 | 5/1986 | Hastings . | |
| 4,773,181 | 9/1988 | Radden | 43/42.37 |
| 5,148,622 | 9/1992 | Blair | 43/42 |
| 5,222,320 | 6/1993 | Erickson | 43/42.32 |

FOREIGN PATENT DOCUMENTS

| | | |
|---|---|---|
| 1098697 | 4/1981 | Canada . |
| 1125507 | 6/1982 | Canada . |
| 2033603 | 3/1994 | Canada . |

*Primary Examiner*—Kurt Rowan
*Attorney, Agent, or Firm*—Ridout & Maybee

[57] ABSTRACT

A lure has an elongated plate form body with a generally concave inner face and generally convex outer face. A hooked member is attached near the rear end of the body. A cross-wise bend close to the rear end of the body defines a linearly profiled head section and a linearly profiled tail section. The tail section is significantly shorter than the head section, and the tail section is inclined inward at an acute angle, typically between 25–45 degrees, relative to the head section. The relative lengths and inclination of the two sections of the lure induce simultaneous flutter and kicking as the lure is pulled at its forward end through water. The lure may be formed of a resilient metal that permits some manual adjustment of the angle of inclination. The angle can be increased to preserve flutter and kick at slower trolling speeds or reduced to avoid spinning at higher trolling speeds.

12 Claims, 2 Drawing Sheets

FISHING LURE

FIELD OF THE INVENTION

The invention relates to fishing lures and the general object of the invention is to provide a lure which flutters and kicks to simulate the action of a wounded or struggling bait fish.

DESCRIPTION OF THE PRIOR ART

A flutter spoon is a well-known variety of fishing lure which attempts to simulate the action of a wounded or struggling bait fish to attract game fish. For purposes of this specification, "flutter" is essentially oscillation through a limited angle about a lengthwise axis of the lure, clockwise and counterclockwise. "Flutter" should be distinguished from "spinning" which is continuous rotation of a lure in one direction, an effect that tends to cause spinners in-line with the lure to fail and tends to hamper catching a fish.

Flutter spoons are often formed of brass plate shaped and dimensioned to have the general profile of a bait fish. The plate is stamped to define a convex outer surface, which is often cosmetically treated to provide the general appearance of a fish, and a concave inner surface. An end of the lure that is foremost as the lure is towed through the water, often referred to as the "head" end, is apertured for fashioning to a fishing line. The rear end of the lure, often referred to as the "tail" end, carries a hooked member, usually with three barbs. The concavity of the lure is conducive to flutter.

SUMMARY OF THE INVENTION

In general terms, the invention provides a fishing lure, whose body is formed with a cross-wise bend close to its rear end. Testing has shown that the bend angle can be selected or adjusted to handle variations in exact geometry, density and trolling speed and to produce reliable flutter and "kicking". The term "kicking" as used in this specification means lateral oscillation in a horizontal plane back and forth through a limited angle about a vertical axis. Kicking results in a V-shaped or X-shaped motion of the lure, depending on trolling speed. Such motion is believed to further imitate the action of a wounded or struggling bait fish.

In one aspect, the invention provides a lure which has an elongated plate form body with a generally concave inner face and an opposing generally convex outer surface. The body has a cross-wise bend which defines a head section and a tail section. A hooked member may be fastened in any conventional manner to the tail section, and fastening means such as a conventional clearance hole can be used near the forward end of the lure to fasten the head section to a fishing line. The tail section is substantially shorter than the head section, and the general plane of the tail section is inclined, preferably at an angle between 25–45 degrees, relative to the general plane of the head section. The relative lengths and inclination of the two sections of the lure induce simultaneous flutter and kicking as the lure is pulled at its forward end through water, for example from a conventional downrigger. The lure may be formed of a resilient metal that permits some manual adjustment of the angle of inclination. In practice, the angle can be increased to preserve flutter and kick at slower trolling speeds (1.5–2.2 miles per hour) or reduced to avoid spinning at higher trolling speeds (2.2 to 2.8 miles per hour).

Most preferably, the length of the tail section is less than one-quarter of the length of the head section. The "length" of either the head or tail section of the lure may be measured along an axis extending centrally from the cross-wise bend respectively to the forward or rear end of the lure body.

Other aspects of the invention will be apparent from a description below of a preferred embodiment and will be more specifically defined in the appended claims.

DESCRIPTION OF THE DRAWINGS

The invention will be better understood with reference o drawings in which.

DESCRIPTION OF PREFERRED EMBODIMENT

Figure 1:
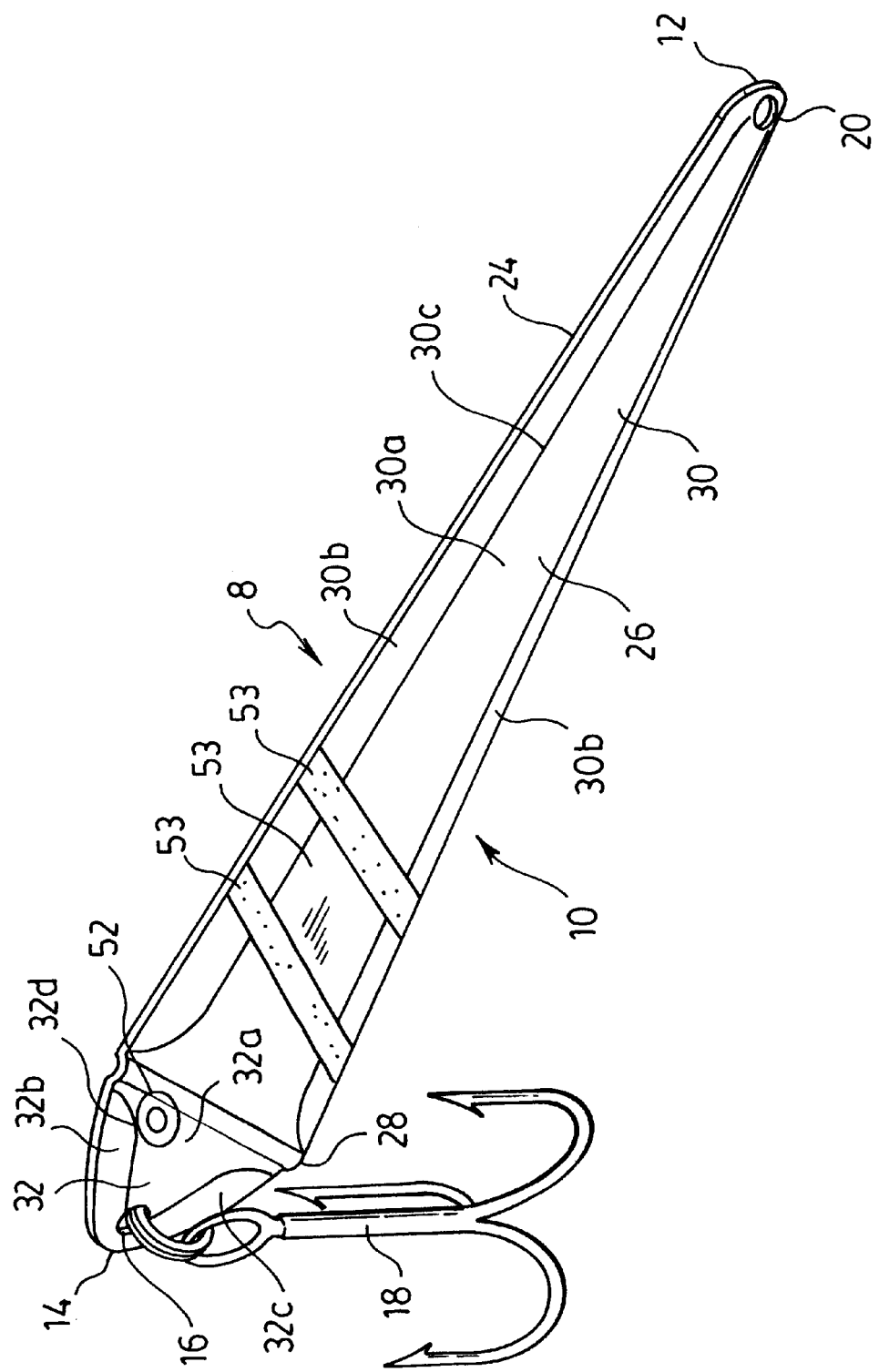
FIG. 1 is a perspective view of a lure in accordance with the invention.

FIG. 1 shows the overall configuration of an exemplary lure 8 stamped of sheet metal. The lure 8 has an elongated plate form body 10 which tapers toward its forward and rear ends 12, 14. A hole 16 is stamped near the rear end 14, and a hooked member 18 is fastened in a conventional manner to the hole 16 so as to swivel in various directions. Another hole 20 is stamped near the forward end 12 to permit fastening to a fishing line (not shown).

Figure 2:
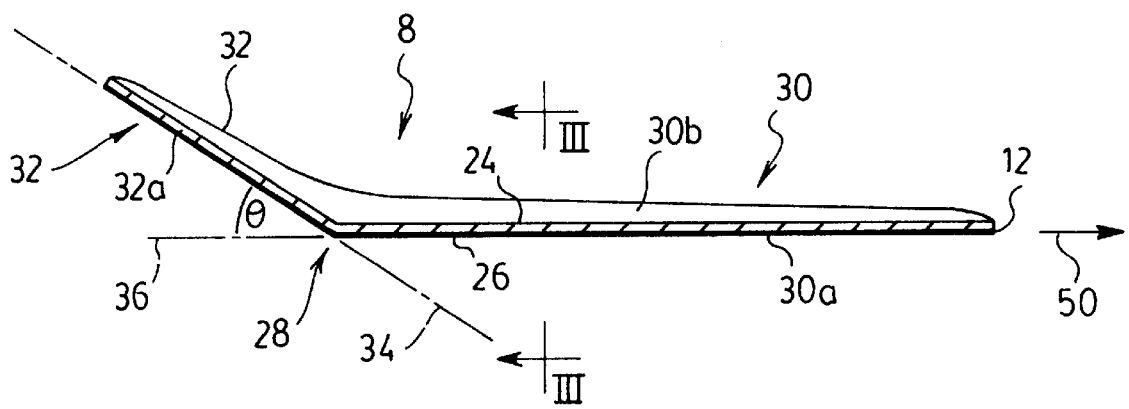
FIG. 2 is a longitudinal cross-section of the body of the lure of FIG. 1.
Figure 3:
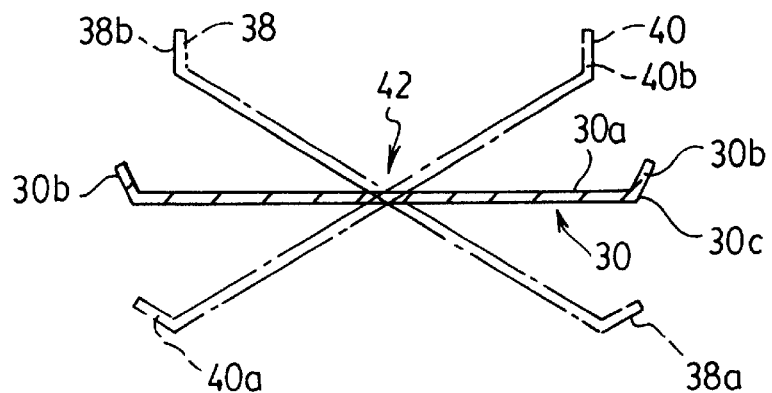
FIG. 3 is a transverse cross-section on the line III–III of FIG. 2 somewhat schematically illustrating fluttering of the lure.
Figure 4:
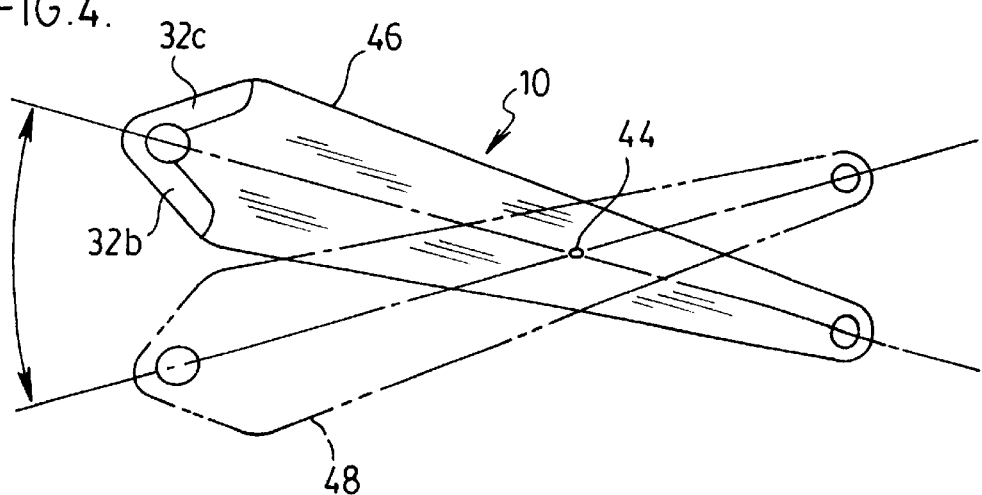
FIG. 4 is a top plan view illustrating kicking of the lure.

The body 10 of the lure 8 is bent along its length during stamping to define a generally concave inner face 24 and an opposing generally convex outer surface 26. A cross-wise bend 28 adjacent a region of maximum width of the body 10 defines a head section 30, extending from the end 28 to the forward end 12, and a significantly shorter tail section 32, extending from the bend 28 to the rear end 14. As seen in FIG. 2, the bend 28 inclines the general plane 34 of the tail section 32 inward at an acute angle θ relative to the general plane 36 of the head section 30. The short tail section 32 and angling serve to induce simultaneous flutter and kicking as the lure 8 is drawn in a forward direction generally horizontally through water. The resulting fluttering action is diagrammatically shown in FIG. 3. The body 10 oscillates back-and-forth about a generally horizontal axis 42 (perpendicular to the plane of the paper and shown only as a point in FIG. 3) between two extreme positions 38, 40 shown in phantom outline. The kicking action is diagrammatically illustrated in FIG. 4. Basically, the body 10 oscillates back-and-forth about a vertical axis 44 (perpendicular to the plane of the paper and shown only as a point in FIG. 4) between the two extreme positions 46, 48 respectively shown in solid and phantom outline. When the lure 8 is towed from a trolling boat, the kicking manifests itself as an X-shaped tracking pattern at higher speeds or as a V-shaped tracking pattern at slower speeds. The two types of action are superimposed and produce a very complex movement which is believed to resemble the action of a wounded bait fish. In actual testing, the preferred embodiment has proven quite successful at attracting and catching fish.

More specifically, in the preferred form of the lure 8, the inner face 24 is wholly concave and the outer face 26 wholly convex. The tail section 32 comprises a central portion 32a, which may be planar or slightly arcuate in cross-section, and the more pronouncedly inclined marginal portions 32b and 32c which meet the central portion 32a at an acutely angled or sharply radiused transition 32d. Similarly, the head section 30 may comprise a central portion 30a which may be planar or slightly arcuate in cross-section and more pronouncedly inclined marginal portions 30b which meet the central portion 30a at an acutely angled or sharply radiused transition 30c.

When towed through the water at moderate speed in the direction of the arrow 50 in FIG. 2, the lure 8 adopts a position somewhat as indicated in FIG. 2 but with the axis of the head section 30 inclined rearwardly downwardly somewhat, because of the weight of the hook 18, so that the bend 28 is lower than the forward end 12. Without wishing to be bound by any theory, the fluttering action is believed to result from reaction of the water with the head section 30 resulting from the increased resistance to movement through the water presented by a leading inclined edge, for example edge 38a, as will be apparent from consideration of FIG. 3, in an initially randomly displaced position 38, as compared to a trailing edge 38b. Edge 38a presents a greater area perpendicular to the direction of motion, resulting in a moment about axis 42 tending to restore the head section 30 of the lure 8 to the neutral position shown in solid lines. As a result of inertia, there is an over-correction or rotation of the lure 8 about axis 42 to the position shown in broken lines at 40 in FIG. 3, whereupon edge 40a becomes a leading edge, offering greater resistance than edge 40b, and as a result there is rotation about axis 42 to the position shown at 38 and so the cycle of oscillation continues.

Again without wishing to be bound by any theory, it is believed the kicking action results from reaction of the water with the tail section 32 in a fashion somewhat similar to that described above with reference to FIG. 3. Thus, assuming body 10 has adopted an inclined position indicated in said lines in FIG. 4, for example as a result of a random displacement, inclined marginal portion 32b, being disposed somewhat more squarely to the direction of motion, will offer greater resistance to movement than portion 32c so that there will be a moment tending to rotate the body 10 in a horizontal plane toward a neutral position, but as a result of inertia the rotation will tend to continue toward an oppositely inclined position indicated at 48 whereupon the restoring moment will act in the opposite sense and hence the cycle of oscillation will continue. The magnitude of the moment inducing kicking will depend, as will be appreciated, on the speed with which the body 10 is towed through the water and the angle between the tail and head sections 32 and 30. If the moment is small, the kicking oscillation may turn the body 10 about the point of attachment of the line to the hole 20, leading to a V-shaped tracking pattern while if it is large the oscillation may tend to turn the body 10 about a point, for example axis 44, intermediate the center of mass of the body 10 and the hole 20 resulting in an X-shaped trailing pattern as would result from the mode of oscillation shown in FIG. 4.

If the moment tending to cause kicking is excessively large, the lure body 10 may make a complete rotation and undesired spinning, i.e. continuous rotation of the body 10 will occur.

Geometry and weight (density) affect the action of the lure 8. The head section 30 may typically have a length which is about 2 to about 10, more preferably about 4 to about 6 times the length of the tail section 32. As the head section 30 is shortened relative to the tail section 32, the lure 8 will tend to rise as it is drawn through the water. As the head section 30 is lengthened relative to the tail section 32, the tendency of the lure 8 to spin increases. Excessive width may reduce the tendency to flutter. It is generally desirable to keep the region of maximum width of the body 10 for example at the bend 28, to about ½ to about 3 times, more preferably about 1 to about 1½ times the length of the tail section 32. Increasing the density of the material from which the body 10 is made will induce a sluggishness, and tend to make the lure 8 sink and reduce or eliminate flutter, while reducing the density will tend to induce spin, and may tend to make the lure 8 rise and ride high relative to the towing line. A material density between about 6 and 10 g/cc, more preferably between about 8 and about 9 g/cc is generally appropriate.

If the plate material from which the body 10 is made is excessively thick, the lure 8 tends to sit down in the water and does not flutter, while if it is made excessively thin the lure 8 may tend to rise up in the water as it is drawn along. The thickness of the plate form body 10 is preferably about 10 to about 25 mil (thousandths of an inch) more preferably bout 14 to about 20 mil.

The principal factor affecting the lure's performance is the angle of the tail section 32 relative to the head section 30. This can be adjusted to accommodate variations in geometry and weight. The angle $\theta$ can be increased to induce flutter and kicking or decreased to suppress spinning. A specific angle can be selected and incorporated during manufacture. However, the material is preferably sufficiently resilient, such as spring brass, that a fisherman can adjust the exact angle $\theta$ by hand to accommodate different trolling speeds, compensating for spinning or inadequate fluttering, as required.

It may be noted that in the preferred form, the head and tail sections 30 and 32 of the body 10 in longitudinal section, as seen in FIG. 2, each exhibit a linear profile and meet at a sharply angular or tightly radiused transition at the bend 28. This configuration imparts an excellent crisply defined kicking motion to the lure 8.

The preferred embodiment has proven very effective. The tapering of the body 10 provides a smooth profile that allows a desired line of travel through the water and provides less resistance to fluttering motion than non-tapering shapes, so that a higher frequency flutter and kick can be achieved at a given trolling speed. Further, the tapered profile imparts the general profile of a bait fish. The body 10 is preferably of spring brass plate and is preferably electroplated with nickel, silver, gold, rhodium or similar inert or corrosion-resisting metal to achieve an overall thickness of about 14–20 mil. The plating also imparts reflective surfaces and enhances rigidity. The outer face 26 that faces down in the water may be painted with an eye 52 or other features, for example bands 53 of distinctive texture or coloring resembling features of a fish to impart a more life-like appearance. The angle $\theta$ between the general planes of the head and tail 30, 32 may be set to 35–45 degrees for slower trolling speeds (1.5 to 2.2 miles per hour) and 20–30 degrees for higher trolling speeds (2.2 to 2.8 miles per hour). The plated spring brass or other metal of the body 10 is sufficiently resilient to allow adjustment of the angle $\theta$ by hand to accommodate different trolling speeds.

It will be appreciated that a particular embodiment of the invention has been described and that modifications may be made therein without departing from the spirit of the invention or necessarily departing from the scope of the appended claims.

I claim:

1. A fishing lure comprising: an elongated plate form body comprising a forward end, a rear end, a generally concave inner surface, an opposing generally convex outer surface, and a substantially straight cross-wise bend dividing the body into a head section extending from the bend to the forward end and a tail section extending from the bend to the rear end, the tail section being substantially shorter than the head section, wherein a longitudinal axis of the body extends along a line of greatest length of the body from the forward end to the rear end;

a hooked member fastened to the tail section; and the head section being adapted for attaching the body to a fishing line;

wherein the cross-wise bend extends transversely across the body at a point of greatest width of the body and is perpendicular to the longitudinal axis of the body, the body tapering in width from the cross-wise bend toward the forward and rear ends;

the cross-wise bend inclining the tail section at an acute angle relative to the head section such that the head section and the tail section meet at a sharply angular or tightly radiused transition at the cross-wise bend;

the head section and the tail section each exhibiting a linear profile along the longitudinal axis;

the tail section comprising a central portion which is planar or slightly arcuate in cross-section parallel to the cross-wise bend and inclined marginal portions extending rearwardly of the cross-wise bend to the rear end of the body, the inclined marginal portions of the tail section meeting the central portion of the tail section at an acutely angled or sharply radiused transition; and the head section comprising a central portion which is planar or slightly arcuate in cross-section parallel to the cross-wise bend and inclined marginal portions extending forwardly of the cross-wise bend to the forward end of the body, the inclined marginal portions of the head section meeting the central portion of the head section at an acutely angled or sharply radiused transition.

2. The fishing lure as claimed in claim 1 wherein the length of the head section is about 2 to about 10 times the length of the tail section.

3. The fishing lure as claimed in claim 2 wherein the length of the head section is about 4 to about 6 times the length of the tail section.

4. The fishing lure as claimed in claim 1 wherein the width of the body at the cross-wise bend is about ½ to about 3 times the length of the tail section.

5. The fishing lure as claimed in claim 4 where the width of the body at the cross-wise bend is about 1 to about 1½ times the length of the tail section.

6. The fishing lure as claimed in claim 1 in which the body has a thickness about 10 to about 25 mil.

7. The fishing lure as claimed in claim 1 wherein the body has a thickness about 14 to about 20 mil.

8. The fishing lure as claimed in claim 1 wherein the density of the body is about 6 to about 10 g/cc.

9. The fishing lure as claimed in claim 8 wherein said density is about 8 to about 9 g/cc.

10. The fishing lure as claimed in claim 1 wherein said head section and tail section each have a substantially linear longitudinal cross-section.

11. The fishing lure as claimed in claim 1 wherein the tail section is inclined to the head section at an angle of about 20 to about 30 degrees.

12. The fishing lure as claimed in claim 1 wherein the tail section is inclined to the head section at an angle of about 35 to about 45 degrees.

\* \* \* \* \*